United States Patent [19]
Hetz

[11] 3,767,326
[45] Oct. 23, 1973

[54] VOLUMETRIC FLOW CONTROL SYSTEM FOR PUMPS

[75] Inventor: Heinz K. Hetz, Doylestown, Pa.

[73] Assignee: Yarway Corporation, Blue Bell, Pa.

[22] Filed: Aug. 4, 1972

[21] Appl. No.: 277,852

[52] U.S. Cl.................. 417/214, 417/383, 417/505
[51] Int. Cl..... F04b 49/02, F04b 49/06, F04b 9/10
[58] Field of Search.................. 417/214, 383, 385, 417/505, 384, 386, 387; 128/1 D, DIG. 3; 3/DIG. 2

[56] References Cited
UNITED STATES PATENTS

| 3,374,750 | 3/1968 | Hetz | 417/387 |
| 1,576,571 | 3/1926 | Carrey | 417/386 |

Primary Examiner—Carlton R. Croyle
Assistant Examiner—Richard Sher
Attorney—John W. Logan, Jr.

[57] ABSTRACT

A control system for controlling the total volume of fluid dispensed at intermittent intervals from a continuously operating pump such as a piston operated diaphragm pump is disclosed. A valved bypass line is provided to bypass fluid from the working fluid chamber of the diaphragm pump back to the piston pump reservoir to selectively permit the working fluid to either actuate the diaphragm pump or return to the piston pump reservoir, depending on whether the bypass valve is open or closed. The bypass valve is operated by a control circuit which may be preset to accurately control the amount of fluid dispensed during each cycle of operation.

10 Claims, 3 Drawing Figures

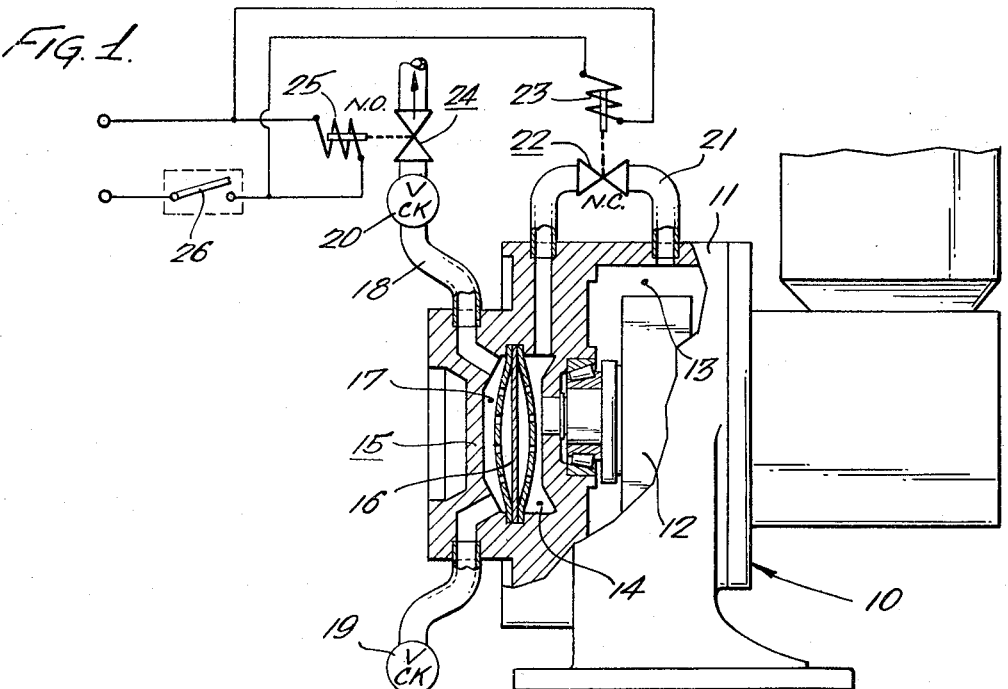
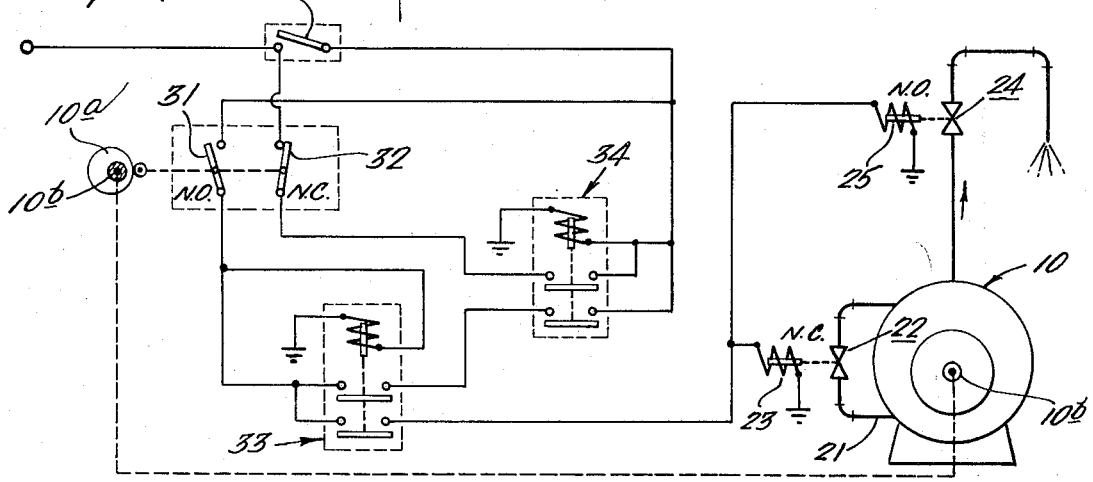
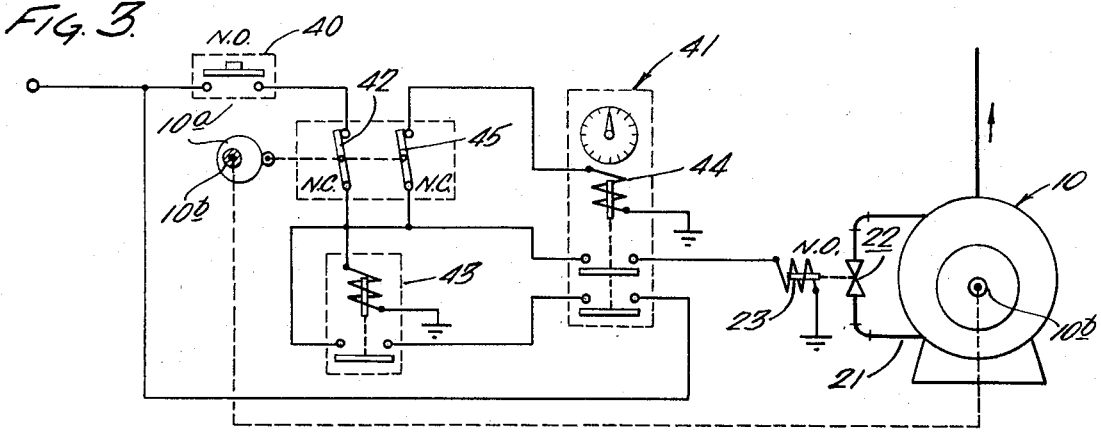

VOLUMETRIC FLOW CONTROL SYSTEM FOR PUMPS

At the present time, piston actuated diaphragm pumps are extensively used to pump accurately metered quantities of fluid. One example of such a pump is disclosed in U.S. Pat. No. 3,374,750, dated Mar. 26, 1968. Pumps of this type can accurately control volume during a continuous operation. However, in many instances a process will only require an intermittent pumping of fluid such that at regular intervals or in response to a signal from the process system a predetermined quantity of fluid is required. Until now, requirements for intermittent pumping of predetermined quantities of fluid have been accomplished by equipping the pumps with electro-mechanical single revolution clutches between the pump drive and the pump or by starting and stopping the pump motor by a timing switch. Such systems are prone to inaccuracies and mechanical and maintenance problems.

According to the present invention a conventional piston operated diaphragm pump is provided with the piston portion of the pump operating continuously to pump working fluid to the working side of the diaphragm pump. This normally will cause flexure of the diaphragm and pump a predetermined quantity of fluid through the pumping chamber during each cycle of operation. A valved bypass line is provided extending from the diaphragm pump working chamber to the reservoir of the piston pump. This bypass is designed to have a low restriction to flow so that when the bypass is opened the working fluid pumped by the piston will move back and forth between the reservoir and the diaphragm pump working chamber and will not cause flexure of the diaphragm. Thus, by selectively opening and closing the bypass, the number of working strokes of the diaphragm can be controlled to accurately pump metered quantities of a fluid.

With the foregoing in mind, a primary object of the present invention is to provide a novel control system for a pump which will permit accurate control of the total quantity of fluid pumped and stop the pumping operation after a predetermined quantity of fluid has been pumped.

Another object of the present invention is to provide a novel system for controlling the number of pumping cycles of a piston operated diaphragm pump without stopping operation of the piston portion of the pump.

A further object of the present invention is to provide a novel internal bypass in a piston operated diaphragm pump together with a control system for opening and closing the bypass in synchronization with operation of the piston to stop and start delivery of fluid by the pump.

Still a further object of the present invention is to provide a novel control system for the above described type of pump which will operate to control operation of the bypass at selected intervals to accurately meter predetermined quantities of fluid.

A still further object of the present invention is to provide a novel pump and system for controlling the pumping operation which is easy to manufacture and maintain, is reliable in operation, and may be readily adjusted to permit accurate pumping of preselected quantities of fluid at preselected intervals.

These and other objects of the present invention and the various features and details of the operation and construction thereof are hereinafter more fully set forth and described with reference to the accompanying drawing, in which:

FIG. 1 is a view illustrating a piston operated diaphragm pump embodying the present invention;

FIG. 2 is a schematic diagram illustrating one form of control system for controlling the pumping operation; and FIG. 3 is a schematic diagram illustrating another form of control system operating in response to the count of cycle of operation of the pump for controlling the quantity of fluid delivered by the pump.

Referring more specifically to the drawings, there is illustrated a motor driven pump 10 of the type described in the above identified U.S. Pat. No. 3,374,750 which incorporates the improvements of the present invention. The pump 10 is an orbiting piston operated diaphragm pump and includes a pump casing 11 containing a rotor 12 which carries the orbiting piston which is adjustable by a shift ring, not shown. The rotor 12 is positioned within a reservoir 13 of pumping fluid and operates to provide continuous pulsations of pumping fluid to the working chamber 14 of a diaphragm pump 15. During normal operation of the pump 10 this causes flexure of the diaphragm 16 of the diaphragm pump causing the diaphragm pump to pump fluid through its pumping chamber 17 to an outlet line 18. Conventional check valves 19 and 20 cooperate with flexure of the diaphragm 16 to control the desired flow of fluid. The pump, as described thus far, is the pump of the above identified patent and operates in the same manner as the pump of the above patent.

In accordance with the present invention, means are provided to prevent flexure of the diaphragm of the diaphragm pump for the purpose of stopping the pumping output without halting operation of the piston portion of the pump. This is accomplished in the illustrated embodiment of the present invention by the provision of a bypass line 21 extending from the working chamber 14 of the diaphragm pump to the piston pump reservoir 13. A valve 22, preferably operated by a solenoid 23 is provided in the bypass 21 to open and close the bypass. The bypass 21 and valve 22 should be large enough to provide a relatively low restriction to flow.

With this construction when the bypass 21 is closed, for example by closing the bypass valve 22, the pump 10 will operate in its normal manner with the diaphragm 16 flexing with each stroke of the piston. Opening the bypass 21 permits fluid to flow back and forth through the bypass from the working chamber 14 of the diaphragm portion of the pump to the bypass pump reservoir 13. Thus, reciprocation of the piston when the bypass is open will merely move fluid back and forth through the bypass and will not cause flexing of the diaphragm 16 thereby stopping the delivery of the fluid by the diaphragm portion of the pump.

To further insure complete stoppage of flow of fluid from the pump when the bypass is open, a valve 24 operated by a solenoid 25 may be provided in the outlet line 18 from the diaphragm portion of the pump. The solenoid 25 will be operated by the same electric circuit which operates the solenoid 23 for the bypass valve so that when one valve is opened, the other is simultaneously closed and vice versa. These two solenoids 23 and 25 may be operated simultaneously for example by closing and opening the switch 26 of the electric circuit shown in FIG. 1.

Preferably, the operation of the valves 22 and 24 should by synchronized with the stroke of the piston pump so that the bypass is opened and closed only at the end of a full stroke of the piston of the piston pump. This will assure the utilization of a full stroke of the operation of the piston pump for each active cycle of the pump. Synchronization is particularly desirable for pumps with high discharge volumes. A lack of synchronization of opening and closing the bypass with the end of a full cycle of operation of the piston could result in erratic performance of the pump and the pump could be subjected to heavy hydraulic shocks.

FIG. 2 illustrates one form of control system for operating the pump of the present invention in response to a signal received from a process system of which the pump is an integral part. With the control system of FIG. 2, delivery of fluid is started and stopped in response to a signal received from the process system. The process system may be any desired system with means for closing a control switch 30 when it is desired to stop delivery of fluid to the system and opening the control switch 30 when it is desired to start delivery of fluid to the process system. The control system of FIG. 2 is synchronized with the stroke of the piston portion of the pump to actuate the solenoids 23 and 25 of the solenoid valves 22 and 24 at the end of a complete piston stroke. To accomplish this a cam 10a is provided on the drive shaft 10b of the pump 10 with the cam interconnected with a pair of microswitches 31 and 32 which function as more fully described hereinafter to permit energization and deenergization of the solenoids 23 and 25 only at the end of a piston stroke. The control switch 30 and microswitches 31 and 32 operate in conjunction with a pair of holding relays 33 and 34 to control the pumping operation.

When the process system requires fluid to be pumped to the system, the control switch 30 is opened. When it is desired to stop pumping of fluid to the control system, for example, in response to the absence of an object to which the fluid is to be applied or in response to the absence of a demand for fluid the control switch 30 is caused to close, thereby completing a circuit to the coil of the holding relay 34 causing the contacts of this relay to close. Also, when the control switch 30 is closed and the piston of the pump reaches the end of a complete stroke, the cam 10a on the pump drive shaft 10b will close the normally open microswitch 31 completing the circuit to the coil of the holding relay 33 causing the contacts of this relay to close. Upon energization of the coils of the relays 33 and 34, a holding circuit for the coil of relay 33 is completed through the lower contacts of the relay 34 and the upper contacts of the relay 33.

Upon closing the relay 33, a circuit is completed through the contacts of both relays 33 and 34 to the solenoids 23 and 25 respectively, of the solenoid valves 22 and 24. The circuit which is completed to the solenoids 23 and 25 is completed through both the switch 30 and the lower set of contacts of the relay 34 and is also completed through the normally closed microswitch 32 which remains closed until the pump piston reaches the end of its stroke at which time the normally open switch 31 closes and the switch 32 is opened. Completion of a circuit to the solenoids 23 and 25 will open the normally closed bypass valve 22 and simultaneously close the normally opened valve 24 in the pump discharge line. This will immediately stop flow of fluid to the process system even though the pump piston continues to operate.

When it is desired to start the flow of fluid to the process system, the control switch 30 is opened. Opening the switch 30 will not break the holding circuit for the relays 33 and 34 since this holding circuit will continue to be completed through the normally closed microswitch 32. However, when the piston of the pump reaches the end of its complete stroke, the cam 10a will momentarily open the normally closed microswitch 32 thereby breaking the holding circuit to the coil of the relays 34 permitting the contacts of the relays 34 to open. Simultaneously with the opening of the contacts to relays 34, the holding circuit to the coil of the relay 33 is broken thereby opening the contacts of the relay 33. Upon opening of the contacts of the relays 33 and 34, the circuit to the solenoids 23 and 25 for the valves 22 and 24 respectively is broken so that these solenoids are deenergized, the bypass valve 22 is closed while the valve 24 in the pump discharge line is opened permitting the pump to resume pumping of liquid. Fluid will continue to be pumped until the switch 30 is again closed.

In the above-described control circuit, the microswitches 31 and 32 function to synchronize operation of the relays 33 and 34 and operation of the bypass valve 22 and discharge line valve 24 with the stroke of the pump piston so that the bypass valve and the discharge valve will only open and close at the end of a full stroke of the piston.

FIG. 3 illustrates another form of control system for controlling output of the pump with this control system operating each time a switch 40 is closed to permit a predetermined quantity of liquid to be discharged by the pump. The predetermined quantity of liquid in turn is controlled by a counter-relay 41 which counts the cycles of operation of the pump and may be preset to stop discharge of fluid by the pump after a predetermined number of cycles of operation. The counter-relay 41 is of the type in which the relay contacts are closed upon initial energization of a coil and which upon subsequant pulses of current to the coil or a second counting coil will move a preset counter one step at a time. After a preset number of steps are registered on the counter, the counter will automatically open the relay contacts.

In the control system of FIG. 3, the bypass valve 22 for the pump 10 is normally open and when the solenoid 23 of this bypass valve is energized, the bypass valve closes permitting discharge of fluid by the pump. When it is desired to actuate the system to pump a predetermined quantity of fluid, the control switch 40 is momentarily closed. This will complete a circuit through microswitch 42 when the microswitch 42 is closed by virtue of the pump piston reaching the end of its stroke and will energize the coil of a holding relay 43 thereby completing a circuit through the contacts of the relay 43. Simultaneously with the completing of a circuit through the coil of relay 43, a circuit is completed through the counter-operated coil 44 of the counter-relay 41 closing both sets of contacts of the counter-relay 41. A holding circuit for the relay 43 is completed through the lowermost set of contacts in the relay 44 and the contacts of the relay 43 to maintain the relay 43 energized after opening of the switch 40. When both the relay 43 and the coil of the counter-relay 41 are energized and the contacts of these two relays are closed, a circuit is completed to the coil 23 of the bypass valve 22 thereby closing the bypass valve and permitting the discharge of fluid by the pump 10. This bypass valve remains closed for a predetermined number of cycles of operation with the number of cycles of operation being determined by the counter-relay 41. A microswitch 45 which is operated simultaneously with the switch 42 from the pump cam 10a is closed at the end of each complete stroke of the pump piston thereby sending a pulse to the coil 44 of the counter-relay 41. Each pulse to the coil 44 actuates the counting mechanism in the counter 41 and after a preset number of pulses, each corresponding to one cycle of operation of the pump 10, the count on the counter-relay 41 is completed thereby opening the relay contacts of the counter-relay 41. This disconnects the circuit to the solenoid 23 of the bypass valve 22 causing the bypass valve to open to stop the pumping operation and simultaneously disconnects the holding circuit to the relay 43 causing the relay 43 to open. With this control circuit, each time the switch 40 is closed, the counter-relay 41 operates at the end of the complete stroke of the piston of pump 10 to cause the pump to discharge fluid for a pedetermined number of cycles of operation of the pump and at the completion of the predetermined number of complete cycles of operation of the pump will stop discharge from the pump.

From the foregoing it will be observed that the present invention provides a novel control system for controlling the total volume of fluid dispensed at intermittent intervals from a continuously operating pump such as a piston-operated diaphragm pump, which control system may function to synchronize the starting and stopping of dispensing of fluid from the pump with the end of a full stroke of operation of the piston of the pump.

The term diaphragm pump as used herein is meant to include a pump in which a flexible member separates a pumping chamber from a working chamber and pulsations of hydraulic fluid in the working chamber normally causes the pumping chamber to pump fluid.

While particular embodiments of the invention have been illustrated and described herein it is not intended to limit the invention to such a disclosure and changes and modifications may be incorporated and embodied therein within the scope of the followig claims.

I claim:

1. In a piston operated diaphragm pump including a diaphragm pump having a working chamber and a pumping chamber separated by a flexible member, and a piston pump operating in fluid communication with a reservoir of pumping fluid to pulsate the pumping fluid into and out of the diaphragm pump working chamber to cause flexure of the flexible member and actuate the diaphragm pump, the improvement comprising: a bypass line providing fluid communication between the diaphragm pump working chamber and the reservoir of pumping fluid, valve means within the bypass line to open and close the bypass line, said bypass line when open permitting pulsations of pumping fluid to flow back and forth between the diaphragm pump working chamber and the reservoir of pumping fluid to thereby prevent flexure of the flexible member and operation of the diaphragm pump, and control means to control operation of the bypass line valve means.

2. Apparatus in accordance with claim 1 in which an outlet line is provided from the diaphragm pump and second valve means in the outlet line operates to open and close the outlet line, said control means operating to open the second valve means simultaneously with closing of the bypass line valve means and close the second valve means simultaneously with opening of the bypass line valve means.

3. Apparatus in accordance with claim 2 in which the bypass line valve means and the second valve means are solenoid operated valves, said control means including an electric circuit connected to the solenoids of both valves, and switch means in said electric circuit to complete and break the circuit to the solenoids of both valves simultaneously.

4. Apparatus in accordance with claim 1 in which means are provided to synchronize operation of said valve means with the end of a complete stroke of the piston of said piston pump.

5. Apparatus in accordance with claim 1 in which said control means includes an electric circuit to operate said valve means, and first switch means in said circuit operating in response to a demand for fluid from said diaphragm pump to start and stop the pumping operation of said diaphragm pump by closing and opening the bypass line valve means.

6. Apparatus in accordance with claim 5 in which second switch means are provided in said electric circuit, said second switch means operating to open and close in response to the stroke of the piston of said piston pump to synchronize the opening and closing of said bypass valve means with the stroke of the piston of said piston pump and only permit operation of said bypass valve means at the end of a complete stroke of the piston of said piston pump.

7. Apparatus in accordance with claim 6 in which said second switch means includes at least one microswitch interconnected with the piston of said piston pump with said microswitch being opened and closed in response to the position of the piston of said piston pump.

8. Apparatus in accordance with claim 5 including a counter in said electric circuit to count pulses of said piston operation after operation of said first switch means, said counter operating to open the circuit to said valve means after the count of preset number of pulses to stop discharge of fluid from said diaphragm pump after a predetermined quantity of fluid has been dispensed by said diaphragm pump.

9. Apparatus in accordance with claim 8 in which second switch means are provided in said electric circuit, said second switch means operating to open and close in response to the stroke of the piston of said piston pump to synchronize the opening and closing of said bypass valve means with the stroke of the piston of said piston pump and only permit operation of said bypass valve means at the end of a complete stroke of the piston of said piston pump.

10. Apparatus in accordance with claim 9 in which said second switch means includes at least one microswitch interconnected with the piston of said piston pump with said microswitch being opened and closed in response to the position of the piston of said piston pump.

* * * * *